US012399610B2

(12) United States Patent
Kaptelinin

(10) Patent No.: US 12,399,610 B2
(45) Date of Patent: Aug. 26, 2025

(54) INERTIAL SCROLLING METHOD AND APPARATUS

(71) Applicant: Viktor Kaptelinin, Hornefors (SE)

(72) Inventor: Viktor Kaptelinin, Hornefors (SE)

(*) Notice: Subject to any disclaimer, the term of this patent is extended or adjusted under 35 U.S.C. 154(b) by 13 days.

(21) Appl. No.: 18/084,717

(22) Filed: Dec. 20, 2022

(65) Prior Publication Data

US 2023/0130520 A1   Apr. 27, 2023

Related U.S. Application Data

(63) Continuation-in-part of application No. 17/355,067, filed on Jun. 22, 2021, now abandoned.
(60) Provisional application No. 63/042,349, filed on Jun. 22, 2020.

(51) Int. Cl.
| | | |
|---|---|---|
| *G06F 3/0482* | (2013.01) | |
| *G06F 3/0481* | (2022.01) | |
| *G06F 3/0485* | (2022.01) | |
| *G06F 3/0488* | (2022.01) | |
| *G06F 3/0354* | (2013.01) | |

(52) U.S. Cl.
CPC .......... *G06F 3/0485* (2013.01); *G06F 3/0481* (2013.01); *G06F 3/0488* (2013.01); *G06F 3/03547* (2013.01)

(58) Field of Classification Search
CPC .... G06F 3/0485; G06F 3/0481; G06F 3/0488; G06F 3/03547; G06F 3/04883; G06F 3/04886
See application file for complete search history.

(56) References Cited

U.S. PATENT DOCUMENTS

| | | | | |
|---|---|---|---|---|
| 8,209,606 B2* | 6/2012 | Ording | ................ | G06F 3/04883 |
| | | | | 345/173 |
| 8,451,236 B2* | 5/2013 | Duarte | .................. | G06F 3/0488 |
| | | | | 345/173 |
| 9,081,496 B2* | 7/2015 | Cho | ....................... | G06F 3/0485 |
| 9,182,897 B2* | 11/2015 | Rogers | ................. | G06F 3/0485 |
| 2002/0030667 A1* | 3/2002 | Hinckley | .................. | C08L 9/06 |
| | | | | 345/173 |
| 2008/0220747 A1* | 9/2008 | Ashkenazi | ............. | G06Q 30/02 |
| | | | | 455/414.1 |
| 2010/0156813 A1* | 6/2010 | Duarte | .................. | G06F 3/0488 |
| | | | | 345/173 |
| 2011/0001709 A1* | 1/2011 | Wang | .................. | G06F 3/04883 |
| | | | | 345/173 |
| 2012/0272181 A1* | 10/2012 | Rogers | .................. | G06F 3/0482 |
| | | | | 715/784 |

(Continued)

*Primary Examiner* — Jordany Nunez

(57) ABSTRACT

The present invention teaches inertial scrolling method and apparatus, according to which the distance, for which the content of a display window scrolls as a result of an inertial scrolling user action, is limited to substantially the distance between (a) the point or area of the display window, which is contacted, or pointed at, by the user when an inertial scrolling is initiated and (b) the border of the display window in the direction of the scrolling. According to an embodiment of the invention, the limitation may be disabled in case of more forceful scrolling user actions. According to another embodiment, the area of the display window, proximal to the point or area, which is contacted, or pointed at, by the user when an inertial scrolling is initiated, is visually highlighted during inertial scrolling.

14 Claims, 11 Drawing Sheets

(56) References Cited

U.S. PATENT DOCUMENTS

| | | | |
|---|---|---|---|
| 2014/0022192 A1* | 1/2014 | Hatanaka | H04N 21/42204 |
| | | | 345/173 |
| 2014/0289671 A1* | 9/2014 | Ohmori | G06F 3/0485 |
| | | | 715/784 |
| 2014/0351746 A1* | 11/2014 | Evans | G06F 40/177 |
| | | | 715/784 |
| 2016/0034126 A1* | 2/2016 | Kaptelinin | G06F 3/0481 |
| | | | 715/708 |
| 2016/0202865 A1* | 7/2016 | Dakin | G06F 3/04886 |
| | | | 715/784 |
| 2018/0300035 A1* | 10/2018 | Kaptelinin | G06F 3/0485 |

* cited by examiner

INERTIAL SCROLLING METHOD AND APPARATUS

CROSS-REFERENCE TO RELATED APPLICATIONS

The present application is a continuation-in-part of U.S. patent application Ser. No. 17/355,067, filed Jun. 22, 2021, with title "INERTIAL SCROLLING METHOD AND APPARATUS" and naming Viktor Kaptelinin as inventor, which claims the benefit of provisional U.S. Patent Application Ser. No. 63/042,349, filed Jun. 22, 2020, with title "KINETIC SCROLLING METHOD AND APPARATUS" and naming Viktor Kaptelinin as inventor. All of the foregoing applications are hereby incorporated herein by reference in their entirety.

FEDERALLY SPONSORED RESEARCH

Not Applicable

BACKGROUND OF THE INVENTION

The invention relates to user interfaces of electronic devices having displays, such as desktop computers, laptop computers, tablet computers, smartphones, electronic bookreaders, car dashboards, control panels of industrial equipment and home appliances, display components of self-service technologies, and so forth.

Electronic devices often comprise displays (or "screens") displaying various types of content. The content is typically displayed in windows. In the context of this invention the term "window" (or "display window") is understood in a broad sense, as a content viewing area of a display of any type.

Only a portion of a window-related content may be displayed in a window, and the user may be enabled to scroll the content, that is, make the displayed content move across the window, to see other portions of the content (a "document"). One particular type of scrolling is "inertial scrolling" (or "kinetic scrolling"), which is a scrolling that continues after the user completes the scrolling user action. For instance, the user may (a) move a finger across a touch sensitive display ("touch screen") in a linear fashion, causing the window content to move in the same direction, and with approximately the same speed, as the movement of the finger, and then (b) abruptly break contact of the finger with the display. As a result, the content displayed on the touch sensitive display may continue to scroll further for an additional distance, even though the user stops performing any user actions with the display. Inertial/kinetic scrolling may be also achieved by performing a scrolling action, similar to the one described above, with a separate input device, such as touchpad or scroll wheel. Inertial/kinetic scrolling is commonly implemented so that the scrolling slows down, and eventually stops, after the user breaks contact with the display.

A problem with inertial scrolling is that it may be imprecise. For instance, it may be difficult for a smartphone user to make a content scroll for exactly the desired distance after the user breaks contact with the smartphone display. This problem is addressed in the present invention.

SUMMARY OF THE INVENTION

The present invention teaches inertial scrolling method and apparatus, according to which the distance, for which the content of a display window scrolls as a result of an inertial scrolling user action, is substantially limited by the distance between (a) a window location (thereafter, "initial window location") of an area of the scrolled window, which area is touched, or pointed at, by the user when an inertial scrolling user action is initiated (such as the location of a touch-sensitive display contacted by a user immediately before the user breaks contact with the display to initiate an inertial scrolling, or the location of screen pointer at a moment when an inertial scrolling is initiated by the user), and (b) the border of the window in the direction of the scrolling.

A method is disclosed for assisting a user of an electronic device in viewing information on said electronic device, said electronic device having at least a processor, a memory storage storing computer-executable instructions, a display having an at least a window displaying a portion of a document, and a scrolling input device, said method comprising the method steps of displaying a first portion of said document in said display window; and detecting an inertial scrolling user action, which scrolling user action detecting comprises at least detecting a direction of said inertial scrolling action and detecting an "initial window location", said "initial window location" being an area of said display window contacted, or pointed at, by the user when an inertial scrolling action is initiated; and scrolling said document to display a second portion of said document in said display window, while limiting a distance of said document scrolling to substantially a distance between said "initial window location" and a border of said display window in the direction of said inertial scrolling.

According to one embodiment of the invention, the method further comprises the steps of detecting an "initial pointed document area," said "initial pointed document area" being a document image area, displayed substantially in said "initial window location" when an inertial scrolling action is initiated; and scrolling said document image in the direction of said inertial scrolling; and highlighting said "initial pointed document area" during said inertial scrolling.

According to another embodiment, visual attributes of said highlighted "initial pointed document area" change when said highlighted "initial pointed document area" reaches a border of said display window in the direction of said inertial scrolling.

According to yet another embodiment, said electronic device comprises a touch-sensitive display, said touch-sensitive display being a display, at least part of which display serving as a sensing input device, and said "initial window location" being a location of a said touch-sensitive display, which location is contacted by a user immediately before the user breaks contact with the display to initiate an inertial scrolling.

According to one embodiment, said electronic device comprises a separate scrolling input device, said separate device being separate from said display, and said display displays a screen pointer controlled by a user, and wherein said "initial window location" is a location of said screen pointer at a moment when an inertial scrolling is initiated by the user.

According to another embodiment, the method further comprises the steps of:
- detecting at least an attribute of an inertial scrolling user action selected from a group comprising at least: speed of the input object, acceleration of the input object, and pressure of input object against the display; and
- inferring a distance, for which a document displayed in said window would scroll if a distance of said document scrolling would not be limited to substantially a distance between said "initial window location" and a border of said display window in the direction of said inertial scrolling; and
- if said inferred distance is greater than a distance between "initial window location" and a border of said window in a direction of said scrolling, and a difference between said distances is not greater than a first predetermined value, then performing inertial scrolling of said document in said window for a distance substantially equal to a distance between "initial window location" and said border of said window in the direction of said scrolling; and
- if said inferred distance is greater than a distance between "initial window location" and a border of said window in a direction of said scrolling, and a difference between said distances is greater than the first predetermined value, then performing inertial scrolling of said document in said window for a distance substantially equal to said inferred distance.

One embodiment further comprises the steps of:
- detecting a speed, with which said document scrolls at a moment when said "initial pointed document area" reaches a border of said display window in the direction of said inertial scrolling; and
- limit said inertial scrolling to the substantially a distance between said "initial window location" and a border of said display window in the direction of said inertial scrolling only if said speed does not exceed a second predetermined value.

According to one embodiment of the invention, the invention is implemented as an apparatus, comprising at least
- a processor; and
- a scrolling input device; and
- a display, adapted to display at least a window adapted to displaying at least a portion of at least a document; and
- a memory storage storing computer-executable instructions;
- wherein said display, said processor, said memory storage, and said computer-executable instructions being adapted to perform the following
- displaying a first portion of a document in a window displayed on said display; and
- detecting an inertial scrolling user action, which detecting comprises at least detecting a direction of said inertial scrolling action and detecting an "initial window location", said "initial window location" being an area of said display window pointed at by a user when an inertial scrolling action is initiated; and
- scrolling said document to display a second portion of said document in said display window; a distance of said document scrolling being limited to substantially a distance between said "initial window location" and a border of said display window in the direction of said inertial scrolling.

According to yet another embodiment, said display is a touch-sensitive display, said touch-sensitive display being a display, at least part of which also serves as a scrolling input device, and said processor, said touch-sensitive display, said memory storage, and said computer-executable instructions are further adapted to perform the following
- detecting a scrolling user action, said action being initiated by touching the display with a scrolling input object, such as a finger; and
- detecting an "initial window location" as a location of a point of a scrolling input object touch at a moment when the user breaks a contact of the scrolling input object and the display to initiate an inertial scrolling.

According to one embodiment, the invention is implemented as an apparatus, wherein said scrolling input device is a device, separate from said display, and said display is adapted to display a screen pointer in said display window, and said apparatus further comprises a screen pointer input device, said screen pointer input device being adapted to control a screen location of said screen pointer, and said processor, said display, said scrolling input device, screen pointer input device, and said memory storage are adapted to detect an "initial window location" as a location pointed at by said screen pointer at a moment when an inertial scrolling is initiated by the user.

According to one embodiment, said screen pointer input device is integrated with said scrolling input device.

TERMS USED IN THE PRESENT APPLICATION

Display is a physical device for visual presentation of electronically stored information. The term "display" is understood in a broad sense, as covering all types of digital displays that can display information contents, including screens of a personal digital artefacts (such as a tablet, smartphone, laptop computer, or desk computer), large-screen wall mounted displays, tabletop displays, embedded system displays (displays of industrial or consumer equipment, including process control systems, self-service technologies, home appliances, etc.), projected displays (images projected on various surfaces), head-mounted displays, smart glasses, and so forth. A display can comprise several monitors, e.g., placed side by side. In the context of the present invention the terms "display" and "screen" are used interchangeably.

Display Window (or Window) is an area of a display, dedicated for displaying its related content (a "document"). Windows may display different types of information objects or sets of information objects, such as texts, pictures videos, user interface elements (e.g., pop-up or pull-down menus, control panels, sets of tiles or icons, or folder views), and so forth, as well as combinations thereof. A display can show one or several windows, which windows can be of various size, location, and shape. A display may show a window with an area coinciding with the area of the entire display, and a window may display one or more embedded windows. At any given moment of time a window can only display a portion of its related content, and a window-related content may need to be scrolled, that is, moved across the window, for other portions of the content to be displayed. A window can be modified, e.g., by opening and closing, resizing, moving around across a display, or changing its related settings. The same window may at different moments be located at different areas of a display.

Window location is the location of a point or an area within a window. Window location of a point can be described in various ways, equivalent in the sense that they can be transformed into each other. For instance, a window location of a point can be defined through window coordinates of the point, such as a pair or values corresponding to, respectively, horizontal and vertical distances from a predetermined "origin", such as one of the corners of the window, to the point. Other coordinate systems, e.g., various Cartesian or polar coordinate systems, can be used. A window location of an area can be defined through window coordinates of one or several points belonging to the area, as well as potential additional parameters. For instance, the window location of a circle can be defined by the coordinates of the center of the circle, as well as the radius of the circle.

If a window does not move relative to a display, then there is 1:1 correspondence between a display location and a window location. If a window at different moments is located at different areas of a display, then the same window location can correspond to different display locations.

Inertial (kinetic) scrolling is a scrolling, which continues after the termination of the scrolling user action, causing the scrolling. Inertial scrolling may be caused, for instance, by a flicking gesture, when the user first rapidly moves an input object (e.g., a finger, fingers, or stylus) across the surface of an input device (e.g., a touch screen or a touch pad), while maintaining contact with the surface, and then abruptly breaks contact with the surface. Inertial scrolling may be implemented so that the scrolled content slows down over time, and eventually stops.

Inertial scrolling may involve two types of scrolling user actions. When performing a pre-inertial scrolling user action, the user is engaged (even if briefly) with a window content, causing the content move, as if applying force to give the content kinetic energy. It is followed by an inertial scrolling user action, which starts when the user disengages from the scrolled content (e.g., breaks contact with a touch screen) and the content continues to scroll.

Forcefulness of inertial scrolling user actions is the amount of force characterizing a scrolling user action and determining the amount of perceived kinetic energy received by the scrolled content from the scrolling user action at the pre-inertial phase. The forcefulness of a scrolling user action can be determined by various attributes of the user action, for instance, it may positively correlate with the speed, acceleration, or amplitude of the user gesture performed before breaking contact with the display or touchpad, the amount of pressure exerted by the user on the display or touchpad during a user gesture before breaking contact with the display, or a combination of the attributes thereof. Other indicators of the user effort when performing a scrolling user action (such as the tension of body or facial muscles) can also be used. The forcefulness of a scrolling user action may also depend on the action trajectory, for instance, a linear trajectory may produce a more forceful scrolling action than a non-linear trajectory.

Document image is a visual representation of the entire content related to a window. In the content of the present invention, "document" is understood as the entirety of various information objects (such as texts, pictures, and videos) and/or their combinations, which can be potentially displayed in a certain window. The present invention exclusively deals with how documents are displayed, rather than with their meaning and formal structure, so, unless specifically indicated, the term "document" is used below in the sense of "document image."

Document image location is the location of a point or an area of a document image. A document image location can be defined similarly to a window location, but within a coordinate system of a particular document image. Since a document image can move in a window, the same area of a document image can be displayed in different window locations, which is illustrated by FIGS. 1e-1g. The figures show document image 170, which is an image of a text document (FIG. 1e). Document image area 173 is a small circle, generally the words "nisi" and "ut". A document image location of area 173 is defined by two Cartesian coordinates, corresponding, respectively, to a vertical distance 175 and a horizontal distance 177 between the center of area 173 and the bottom left corner of document image 170 (which corner serves as the origin of a coordinate system for defining document image locations within document image 173).

FIG. 1f shows display window 180, displaying document image 170. Document image 170 is too large to be entirely displayed in window 180, and only part 183 of image 170 can be displayed in window 180. Part 183 comprises document image area 173, so that area 174 is displayed in window 180. FIG. 1f shows window location of area 173 as defined by two Cartesian coordinates, corresponding, respectively, to a vertical distance 185 and a horizontal distance 187 between the center of area 173 and the top left corner of window 180 (which corner serves as the origin of a coordinate system for defining window locations within window 180).

FIG. 1g shows display window 180, displaying document image 170, when image 170 is scrolled four lines of text up in window 180, compared to how image 170 and window 180 are shown in FIG. 1f. FIG. 1g shows that, while the document image location of area 173 has not changed after the scrolling, the window location of area 173 is different. The vertical scrolling, illustrated by FIGS. 1f and 1g, changed the vertical window coordinate of area 173 from a value corresponding to distance 185 to a value corresponding to distance 186. No horizontal scrolling was involved, so the horizontal window coordinate of the window location of area 173 has not changed. A vertical scrolling for a longer distance could result in area 173 being not visible in window 180. In that case there would no window location of area 173 in window 180.

BRIEF DESCRIPTION OF THE DRAWINGS

FIGS. 1a-2d illustrate a scrolling method according to a variation of the first embodiment of the invention, which variation includes using a touchscreen.

DETAILED DESCRIPTION OF THE INVENTION

The subject matter disclosed in this section relates to assisting a user of an electronic device in viewing information on said electronic device, said electronic device having at least a processor, a memory storage storing computer-executable instructions, a display having an at least a window displaying a portion of a document, and a scrolling input device.

First Embodiment of the Invention

The first embodiment of the invention is illustrated by FIGS. 1-4. The embodiment describes an inertial scrolling of a touchscreen display window content.

Figure 1A:
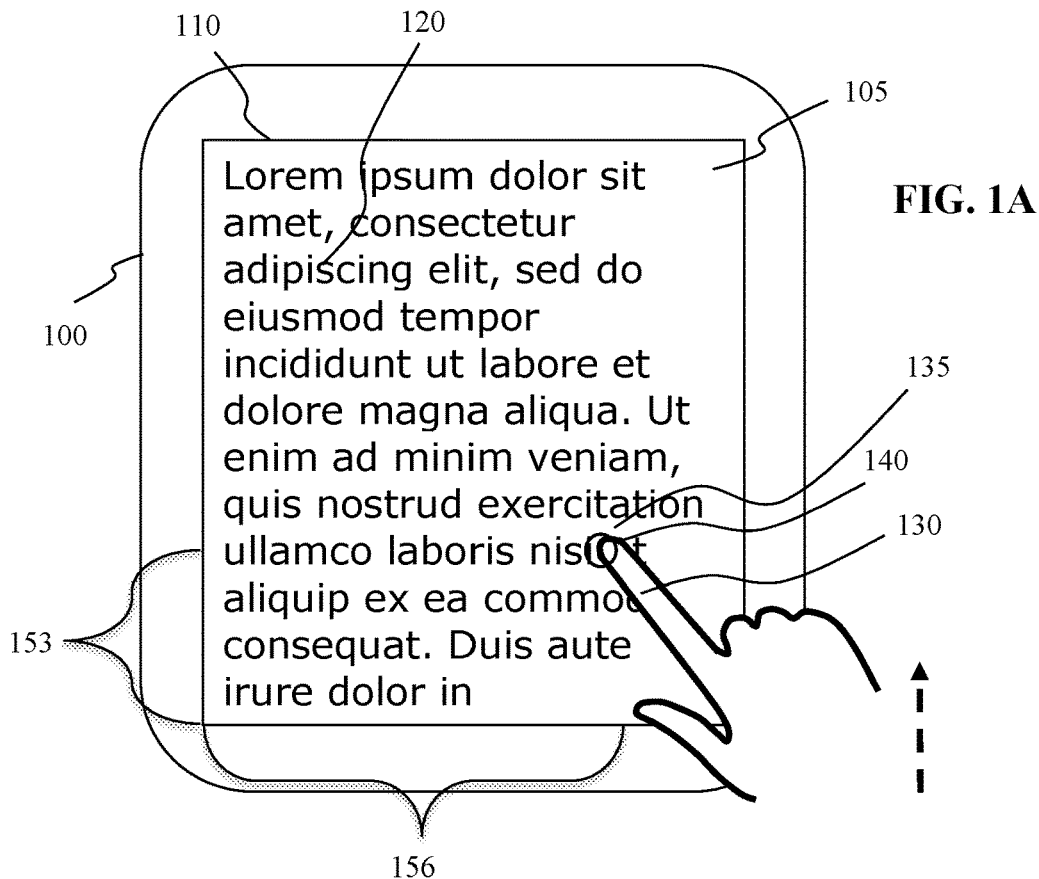
Figure 1B:
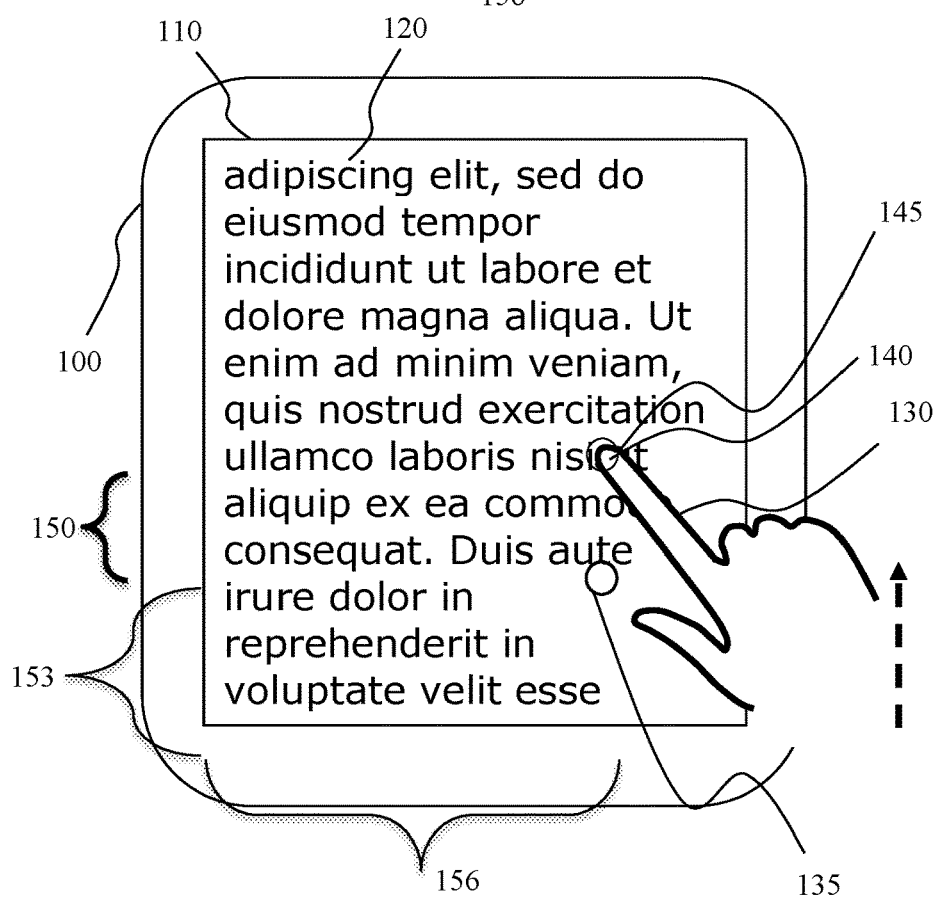

FIGS. 1a and 1b illustrate an outcome of a pre-inertial scrolling user action. FIG. 1a shows a mobile computing device 100 (e.g., a tablet). Device 100 has touchscreen display 105, which displays, window 110. Window 110 takes the entire space of display 105.

Window 110 displays a first portion of document image 120. Document image 120 cannot be entirely displayed in window 110, and to view other parts of document image 120, the user employs input object 130, a finger, to scroll document image 120 up. The user performs a pre-inertial scrolling user action by using input object 130 and touching display 105. The user points at a window location 135 located higher (by distance 153) and to the right of (by distance 156) the bottom left corner of window 110. Window location 135 is displaying an area 140 of document 120, approximately between the words "nisi" and "ut". FIG. 1b shows window 110 displaying a second portion of document 120 (partly overlapping with the first portion, shown in FIG. 1a). Displaying the second portion is caused by moving input object 130 up for distance 150, while keeping contact between display 105 and input object 130. As a result, document 120 scrolls two lines up, so the top two lines of the first portion are no longer visible, and two new lines are displayed at the bottom of window 110. The scrolling from the first portion to the first portion is panning, during which input object 130 has uninterrupted contact with display 105.

FIG. 1b shows the moment just before the user breaks contact with display 105, so FIG. 1b depicts a transition from a pre-inertial scrolling to an inertial scrolling. When input object 130 points to window location 145, located higher, by distance 153, than window location 135, the user breaks contact between input object 130 and display 105. Therefore, window location 145 is a window location that the user points to immediately before disengaging with the scrolled content (that is, breaking contact with display 105). Document image area 140, displayed in the proximity of window location 145, becomes "initial pointed document area". Area 140 is defined as a circle with the center being the center of window location 145; the size of area 140 is approximately the size of the contact area between input object 130 (user's finger) and display 105 when the user touches display 105.

When the user breaks contact with display 105, performing an inertial scrolling user action, inertial scrolling starts. "Initial pointed document area" 140 is highlighted with a highlighting visual artifact, for instance, a yellow circle of substantially the size of initial pointed document area 140, which may make area 140 visually different from the rest of document image 120. After the inertial scrolling is initiated, document 120 continues to scroll in the direction determined by the movement of input object 130. "Initial pointed document area" 140, which moves during the inertial scrolling as a part of document 120, remains highlighted.

FIGS. 1a-1b describe the case when inertial scrolling detected at substantially the moment when the user breaks contact with display 105. If inertial scrolling is not detected, e.g., when no further scrolling takes place when the user breaks contact with display 105, the document image displayed at the point of user's contact with the display immediately before the user breaks contact with the display, does not become an "initial pointed document area"

Figure 1C:
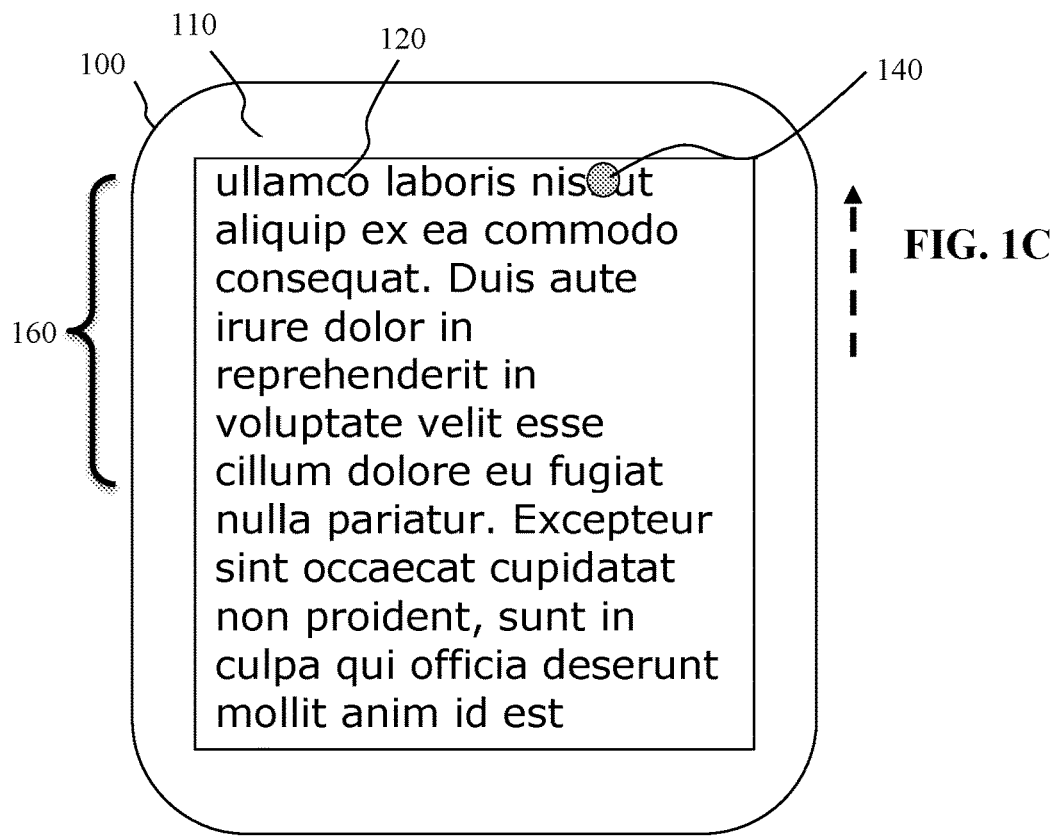

FIG. 1c shows window 110 displaying the third portion of document 120 (which portion is partly overlapping with the first and the second portions shown in FIGS. 1a and 1b). The document image displayed in window 110 is the result of inertial scrolling of document 120 towards the top border of window 110 by distance 160 (approximately 6 lines of text) compared to the view of document 120 at the moment when initial scrolling was initiated (FIG. 1b). The inertial scrolling stops after image of document 120 moves up for distance 160, and initial pointed document area 140 substantially reaches the top border of window 110. To indicate the stop of the scrolling, the highlighting visual cue (a yellow circle of approximately the size of area 140) changes its shape as if it "bumps" into the window border, temporarily flattens, and then restores the shape. The highlighting of initial pointed document area 140 is disabled after the inertial scrolling stops. The highlighting is disabled either immediately or after a delay.

Figure 1D:
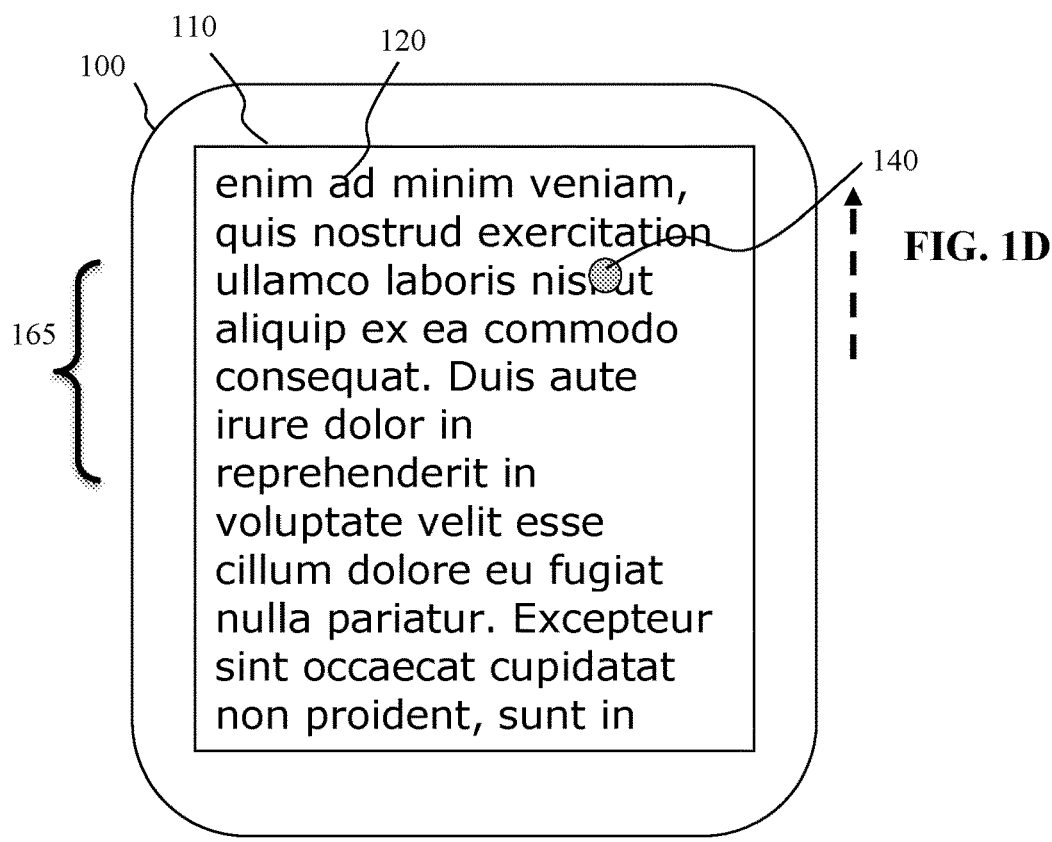
Figure 1E:
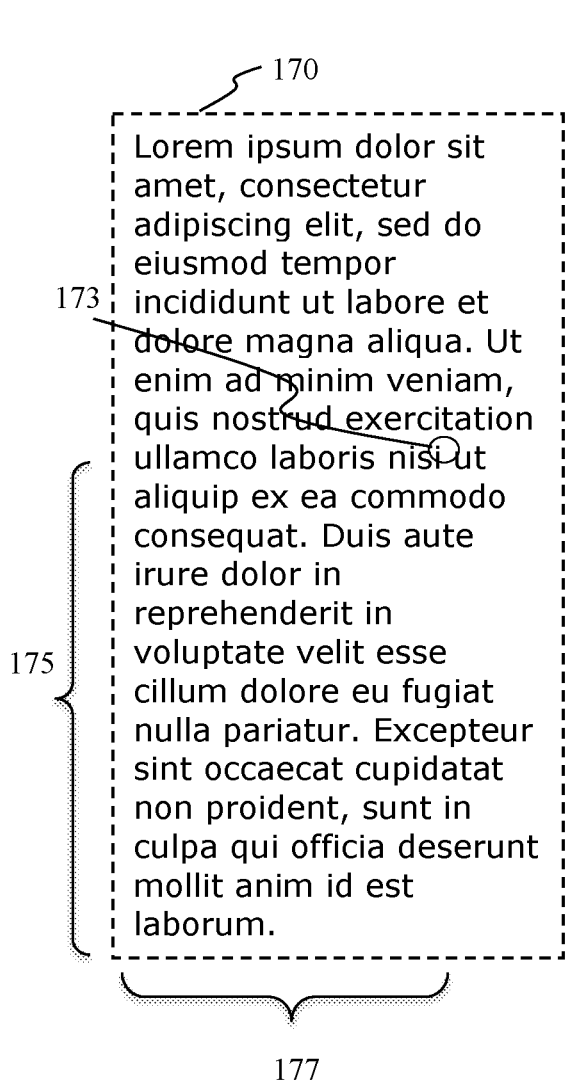
FIGS. 1e-1g illustrate the terms "document image", "window location", and "document image location" in the context of the present invention.
Figure 1F:
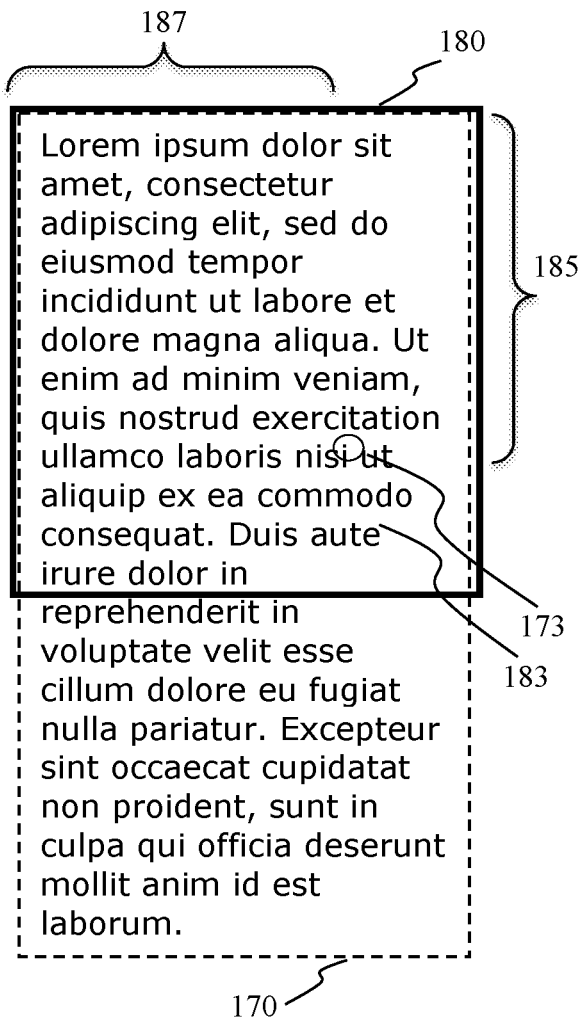
Figure 1G:
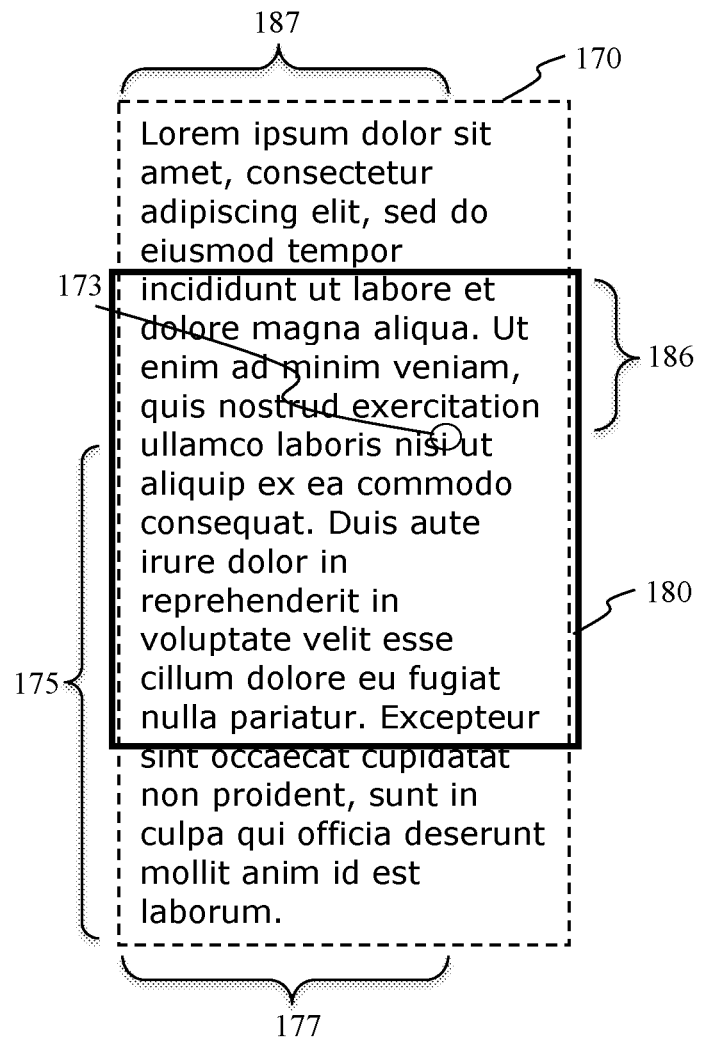

FIG. 1d shows a potential result of inertial scrolling according to the first embodiment, which is different from the one depicted in FIG. 1c. FIG. 1d shows a view of window 110, in which the inertial scrolling initiated at the moment shown in FIG. 1b, slows down and stops before area 140 reaches the top border of window 110 because user's scrolling action, initiated the inertial scrolling, has not been forceful enough to move document image 120 to the upper border of window 110.

Therefore, according to the first embodiment, disclosed above and illustrated by FIGS. 1a-1d, the distance, for which a document image scrolls during inertial scrolling, is limited by the distance between the window location of "initial pointed document area" at the moment when the inertial scrolling starts, and the window border in the direction of inertial scrolling. The actual scrolling distance can be smaller: in case of less forceful scrolling user actions, inertial scrolling may stop before an "initial pointed document area" reaches a window border (as it is shown in FIG. 1d).

In the above disclosure of the first preferred embodiment, an inertial scrolling user action is considered to be performed when the user disengages from the scrolled content (e.g., breaks contact with the display). Therefore, detecting an inertial scrolling user action should involve: (a) detecting a moment when the user disengages with a scrolled content (e.g., breaks contact with a touch screen or other input device, let go of a scroll wheel, increase the distance between a touch screen or other input device and an input object such as a finger, etc.), and (2) determining that the parameters of scrolling (e.g., its speed or direction) and the scrolled content (e.g., whether there is space for further scrolling) at the moment of the disengagement enable further scrolling of the content.

Alternatively, a pre-inertial scrolling user action (e.g., as depicted in FIG. 1a) can be considered as the first part of a two-part inertial scrolling user action. In that case the start of a scrolling action can be retrospectively considered a start of an inertial scrolling user action if the action is followed by an inertial scrolling after the user disengages with the scrolled content. Such redefinition of inertial scrolling user actions, while suggesting an alternative way of detecting an inertial scrolling user action, would be consistent with the disclosure of the first embodiment, illustrated by FIGS. 1a-1d. An "initial pointed document area", as a document area pointed at/contacted by the user when an inertial scrolling user action is detected, would be defined as the area displayed in window location 135 (FIG. 1*a*) rather than in window location 145 (FIG. 1*b*). However, it would be the same document image area 140, so the scrolling depicted in FIGS. 1*a*-1*d* would be exactly the same.

First Variation of the First Embodiment

The first variation of the first embodiment is an inertial scrolling, which, once initiated, does not stop until an "initial pointed document area" reaches a window border. Even a small effort scrolling user action, if it is sufficient to produce an inertial scrolling, will cause a document to scroll for substantially the distance between the window location of "initial pointed document area" at the moment when the inertial scrolling starts, and the window border in the direction of inertial scrolling. Therefore, according to the first variation, the actual pathway of an inertial scrolling caused by a certain scrolling user action is not just limited but is substantially equal to the above distance (i.e., cannot be smaller than the distance). Inertial scrolling according to the first variation can be implemented with various parameters, such as speed and acceleration/deceleration.

Second Variation of the First Embodiment

The second variation of the first embodiment is presented on p.18 of this document.

Other Variations of the First Embodiment

Various other variations of the first embodiment are obvious to those skilled in the art and are covered by the present invention.
- the document can be scrolled in any direction: vertical (up, down), horizontal (left, right), or a direction having both a vertical and a horizontal component (as shown in FIG. 2)
- initial pointed document area may or may not be highlighted;
- various input devices (touch screens, touch pads, scroll wheels, etc.,) and various input objects (finger or fingers, stylus, etc.) can be used by the user;
- visual effects indicating that initial pointed document area has reached a window border may or may not be used; if they are used, various types of visual effects can be employed;
- the panning (pre-kinetic) phase of the scrolling illustrated in FIG. 1 may be larger or smaller comparted to the kinetic phase, and in some cases the panning phase may be negligible;
- an ongoing inertial scrolling can be stopped, or a new scrolling action can be initiated, if a user performs a user action using an input device (e.g., touches the display) before an "initial pointed document area" reaches a border of the window;
- an inertial scrolling may be stopped when different parts of an "initial pointed document area", for instance, its center point or an outer edge, reach a border of the window, or an "initial pointed document area" may stop at a certain distance before reaching the border In addition, "initial pointed document area" may have various sizes and shapes. For instance, the size of such an area may be defined as having approximately the size of the tip of an input object. The size can be defined adaptively and can positively correlate with the size of the detected contact area characteristic of a certain input object (it can be larger, for instance, for fingers than styluses, and be different for fingers of different users). The shape of an initial pointed document area may be a standard shape (such as a circle) or an approximation of the actual contact area between the input object and the display. A guideline for deciding upon the size of an "initial pointed document area" may be choosing a smallest area, which can still be clearly visible when a highlighting visual cue is enabled.

The distance, for which inertial scrolling continues according to the first embodiment, can be calculated in different ways obvious to those skilled in the art. For instance, the distance can be calculated as a difference between two display locations: (a) display location of the display area where the user breaks contact with the display at the beginning of inertial scrolling, and (b) display location of the window border in the direction of scrolling. Alternatively, the distance can be calculated as a difference between two window locations: (a) "initial window location", and (b) the window border in the direction of scrolling. Another alternative is to calculate the distance as a distance between two locations of the document image: (a) "initial pointed document area" and (b) the document image area proximate to window border in the direction of scrolling at the beginning of inertial scrolling. Finally, inertial scrolling may stop when the distance between "initial pointed document area" and a window border becomes less than a predetermined value, so that the distance of inertial scrolling is not calculated in advance but rather determined on a moment-to-moment basis by substantially continuously monitoring relative positions (display locations, window locations, or document image locations) of "initial pointed document area" and window borders.

A variation of the first embodiment is document scrolling achieved by the user by performing a mid-air scrolling gesture over the surface of a screen without touching the screen. In this case the "initial window location" is the window location that the user explicitly or implicitly points to at the moment when an inertial scrolling is initiated by the user. An inertial scrolling can be initiated, for instance, by rapidly increasing the distance between the display and the input object (such as user's fingers). For instance, "initial window location" can be the area of the window in closest proximity to the scroll object, such as user's finger or fingers, stylus, and so forth.

Similarly, using a separate touch sensitive input device, isomorphic to the display, also represents a variation of the first embodiment similar to the one illustrated by FIG. 1. If locations of a touch sensitive input device are mapped to locations of a display (for instance, if the surface of the input device is placed on a flip side of a display, that is, the surface of a back side of an electronic product, opposite to the display, serves as touch sensitive input) then multi touch gestures on the input device have similar effects as multi touch gestures on touch sensitive display, shown in FIG. 1.

A Method for Establishing the Distance of Inertial Scrolling

Figure 2A:
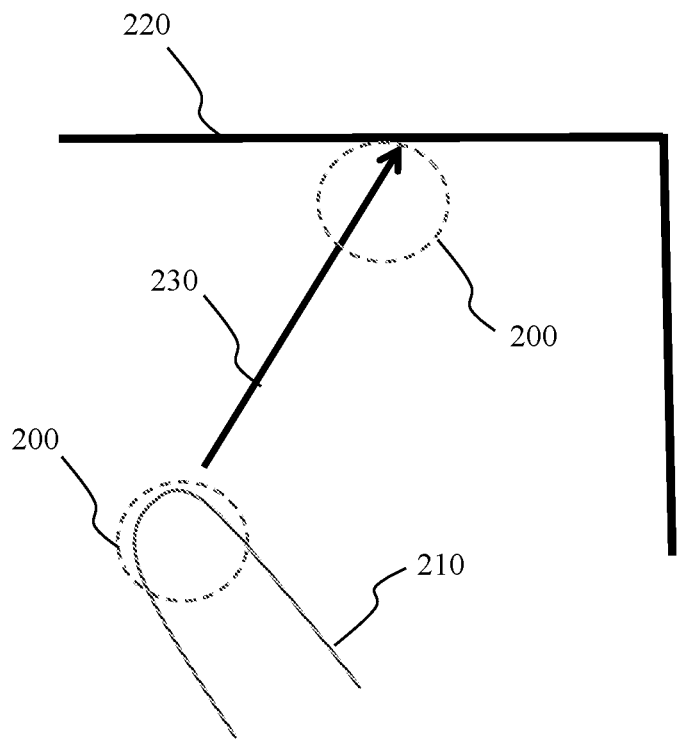
FIGS. 2a-2b illustrate variations of inertial scrolling according to the first embodiment, where scrolling has both a horizontal component and a vertical component.

FIG. 2*a* illustrates a method for establishing the distance of inertial scrolling according to the present invention. The example illustrated by FIG. 2*a* is method, according to which "initial pointed document area" 200 is has the shape of a circle located generally around the tip of input object 210 (in this case, a finger) when maintaining contact. The distance of inertial scrolling is determined as the shortest distance between (a) the perimeter of area 200 and (b) the point of first contact between area 200 and window border 220 when area 200 moves in direction 230, which direction is the direction of inertial scrolling.

Figure 2B:
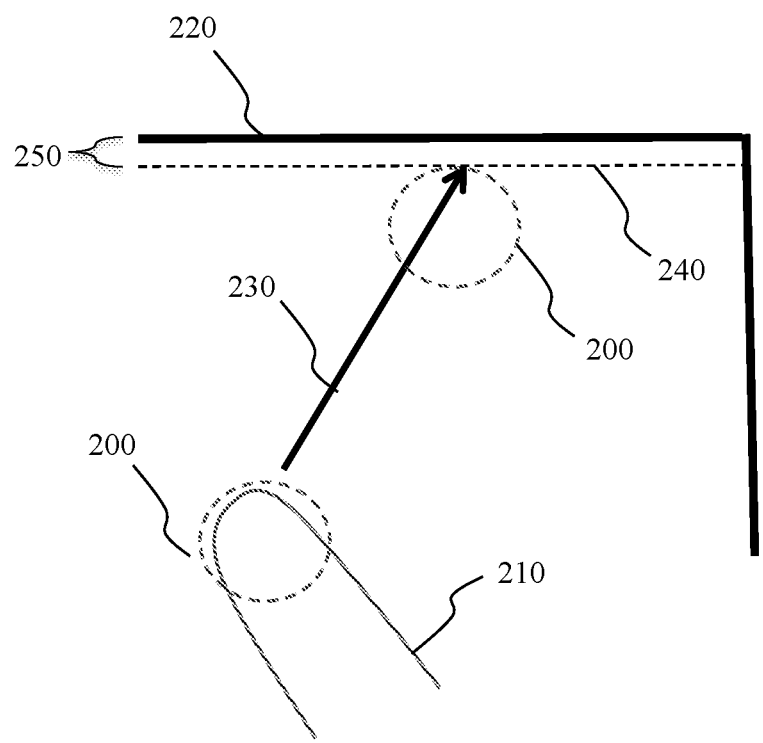

The distance of inertial scrolling according to the present invention can also be calculated using other methods obvious to those skilled in the art. FIG. 2b shows a variation of the method shown in FIG. 2a. According to this variation inertial scrolling distance is the shortest distance between (a) the perimeter of area 200 and (b) the point of first contact between area 200 and line 240, when area 200 moves in direction 230, which direction is the direction of inertial scrolling. Line 240 is a line parallel to window border 220, located closer to the geometric center of the window with offset 250. Other potential alternatives include, for instance, using the geometric center of "initial pointed document area", instead of its perimeter, for determining the distance of inertial scrolling movement.

Second Embodiment of the Invention

Figure 3A:
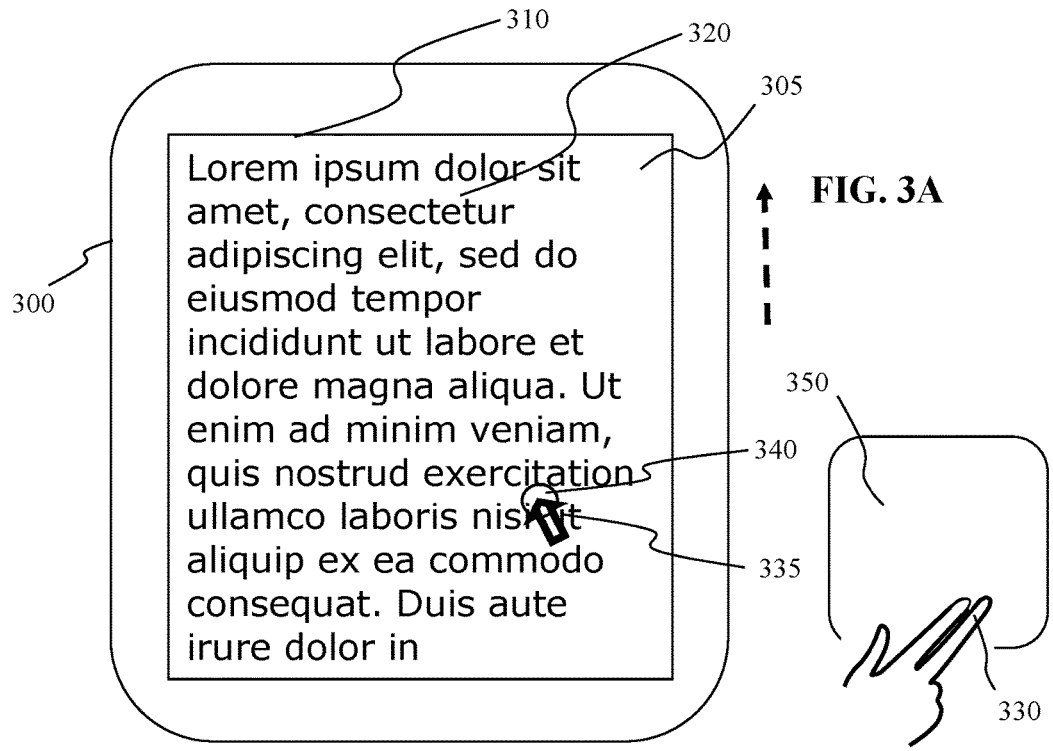
FIGS. 3a-3c illustrate a scrolling method according to the second embodiment of the invention, which embodiment includes using a touchpad.
Figure 3B:
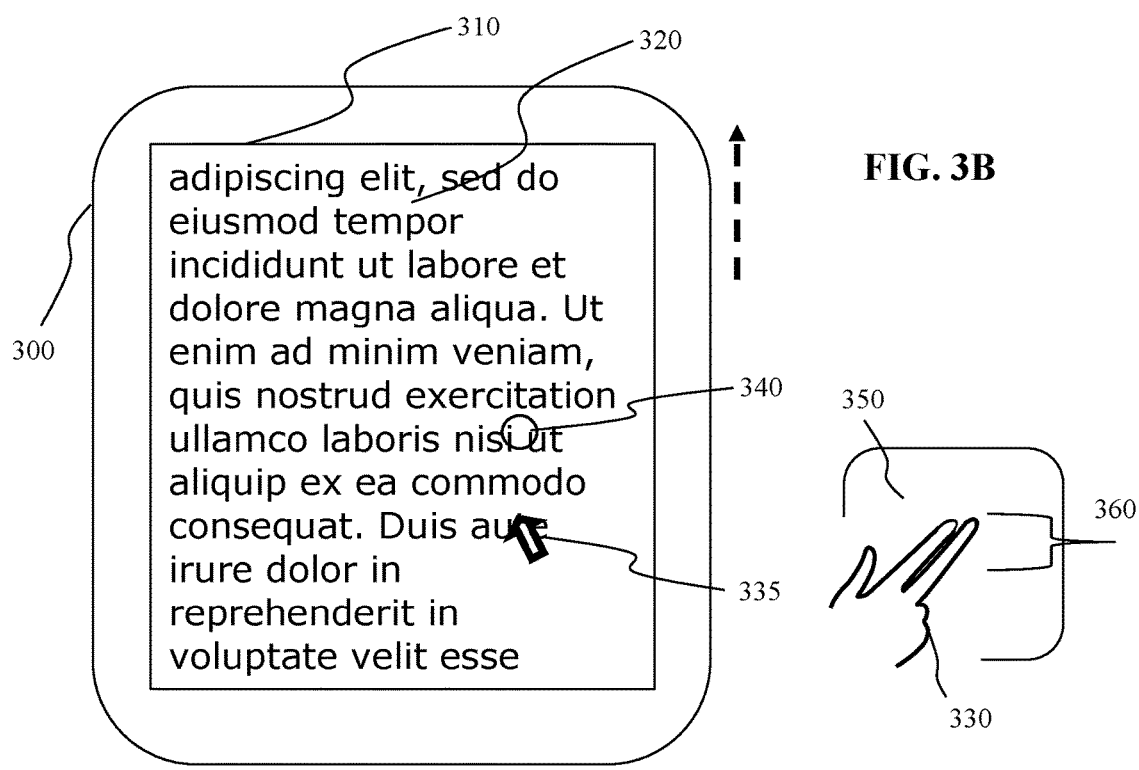
Figure 3C:
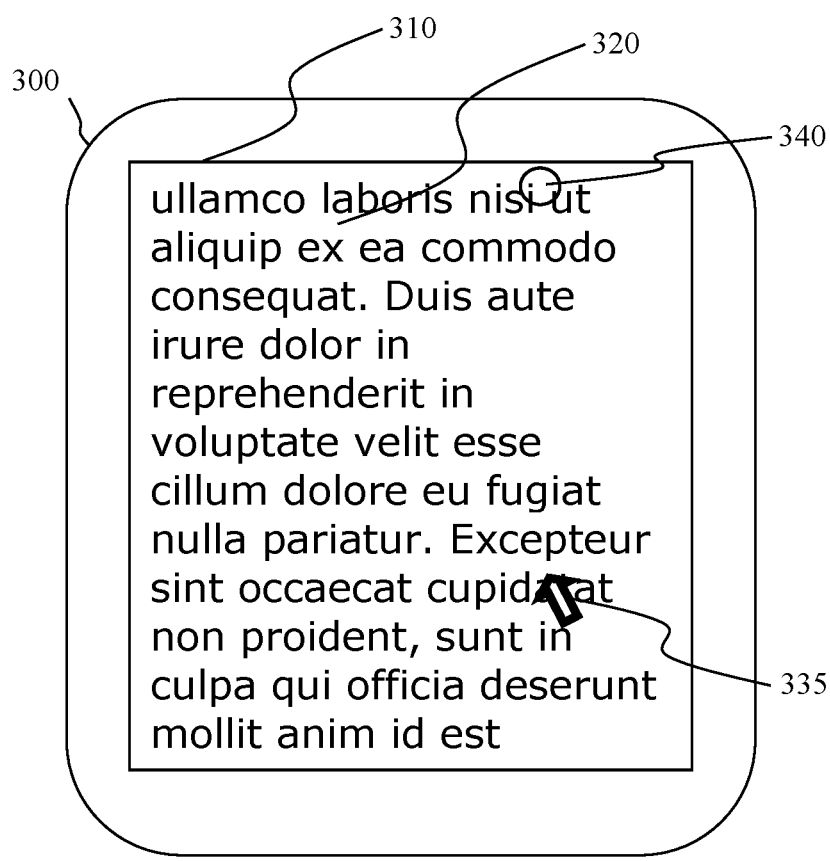

FIGS. 3a-c illustrate a second embodiment of the invention. The main difference between from the first embodiment is that the second embodiment describes an inertial scrolling caused by using a separate input device, a touch pad. FIG. 3a shows electronic device 300, which has display 305 showing window 310. Window 310 displays a first portion of document 320. Screen pointer 335 is also shown in window 310. Document 320 can be scrolled in window 310 by sliding input object 330 (e.g., two fingers) over touch pad 350, which is a separate component of device 300, different from display 305. FIG. 3a shows the initial moment of a scrolling action when the user places input object 330 on touch pad 350 and is about to move input object 330 up to cause document 320 scroll up. At this moment screen pointer 335 points to area 340 of the image of document 320, which area is located in the upper part of the $4^{th}$ line from bottom, generally between "nisi" and "ut". Area 340, "initial pointed document area", is marked on FIG. 3b with a small circle.

FIG. 3b shows window 310 displaying a second portion of document 320. The second portion is produced by moving input object 330 up for distance 360 while continuously keeping contact of input object 330 with touch pad 350. As a result, document 320 is scrolled two lines up, so the top two lines of the first portion are no longer visible, and two new lines are displayed at the bottom of window 310. The scrolling from the first portion to the first portion is panning, during which the input object has uninterrupted contact with touch pad 350.

FIG. 3b shows the end point of the panning user action, and also the beginning of an inertial scrolling user action (the transition from the panning to inertial scrolling), when the user breaks contact between input object 330 and touch pad 350. Document 320 continues to scroll after the user breaks contact between input object 330 and touch pad 350. "Initial pointed document area" 340 is highlighted with a highlighting visual artifact, for instance, a yellow circle, visually different from the image of document 320. After inertial scrolling is initiated, document 320 continues to scroll in the direction determined by the movement of input object 330, that is, the direction of scrolling from the first portion of document 320 (FIG. 3a) to the second portion of document 320 (FIG. 3b). Initial pointed document area 340, which moves along with the inertial scrolling as a part of document 320, remains highlighted.

FIG. 3c shows window 310 displaying the third portion of document 320. The document image displayed in window 310 is the result of inertial scrolling of the second portion of the image of document 320 towards the top border of window 310 for approximately six lines of text. The inertial scrolling stops when initial pointed document area 340 substantially reaches the top border of window 310. To indicate the stop of inertial scrolling, the highlighting visual cue (e.g., a yellow circle) changes its shape as if it "bumps" into the window border, temporarily flattens, and then restores the shape. The highlighting of initial pointed document area 340 is disabled after the inertial scrolling stops. The highlighting visual cue is disabled either immediately or after a delay.

While FIG. 3 describes an embodiment of the present invention, which only includes using a touch pad as a separate scrolling input device, it is obvious to those skilled in the art that the description can be applied to a variety of other separate scrolling input devices, such as a scroll wheel. In addition, the second variation of the first embodiment (FIGS. 5a-b), that is, enabling a window content to scroll beyond a window border in case of more forceful scrolling user actions, also applies to the second embodiment in a way, obvious to those skilled in the art.

Third Embodiment of the Invention

FIG. 4 shows the third embodiment of the invention. The embodiment is different from the first two embodiments as it provides a unidimensional scrolling input device or devices placed just outside the display, e.g., along the right vertical border, which devices are used without the user directly pointing to a scrolled content. There is substantially a 1:1 correspondence between the coordinates of said input device and coordinates of the display according to one dimension (either vertical or horizontal). For instance, an input device located along the right vertical border of a display can be of the same height as the display and placed at the same level as the display, so that a point, selected on the input device, would directly correspond to a horizontal line a of the display image immediately to the left of the selected input device point. Accordingly, an "initial pointed document area", as opposed to the first two embodiments, is defined by only one coordinate (only horizontal or only vertical), and its size may take up to an entire height or width of the display.

Figure 4A:
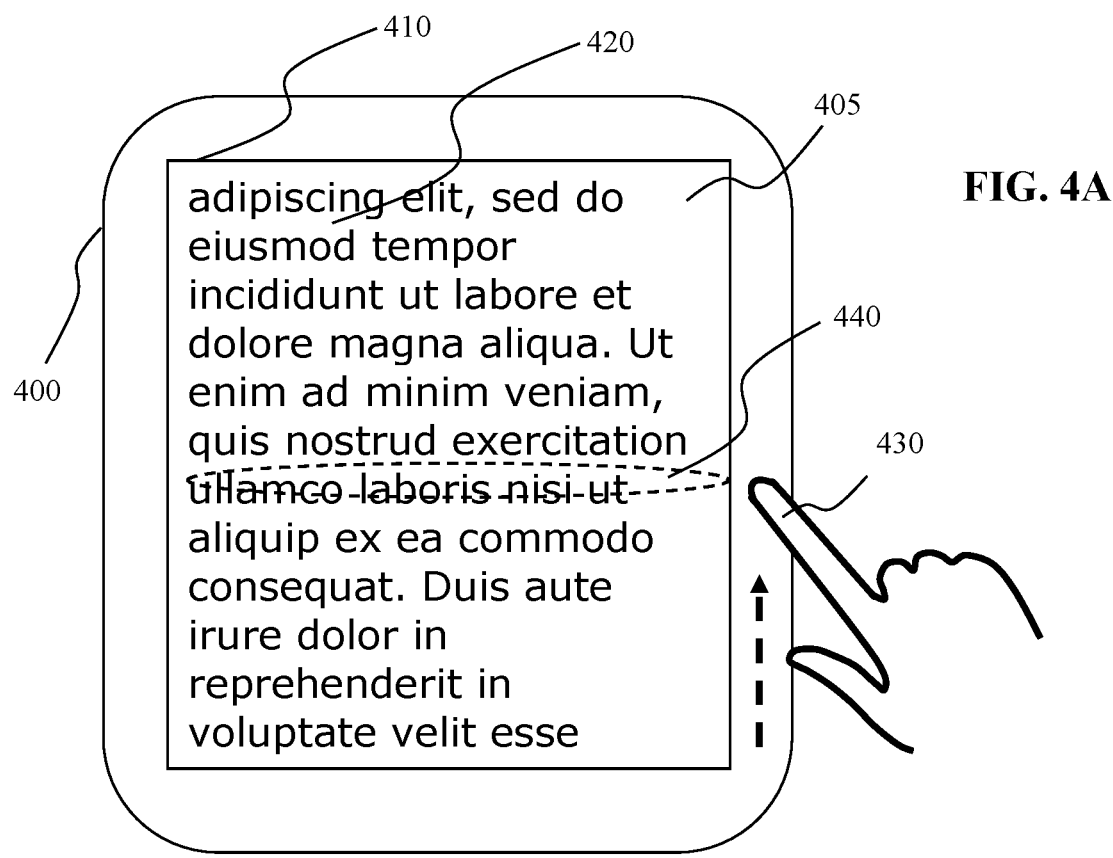
FIGS. 4a-4b illustrate a scrolling method according to the third embodiment of the invention which embodiment includes using an area outside the display for scrolling input.
Figure 4B:
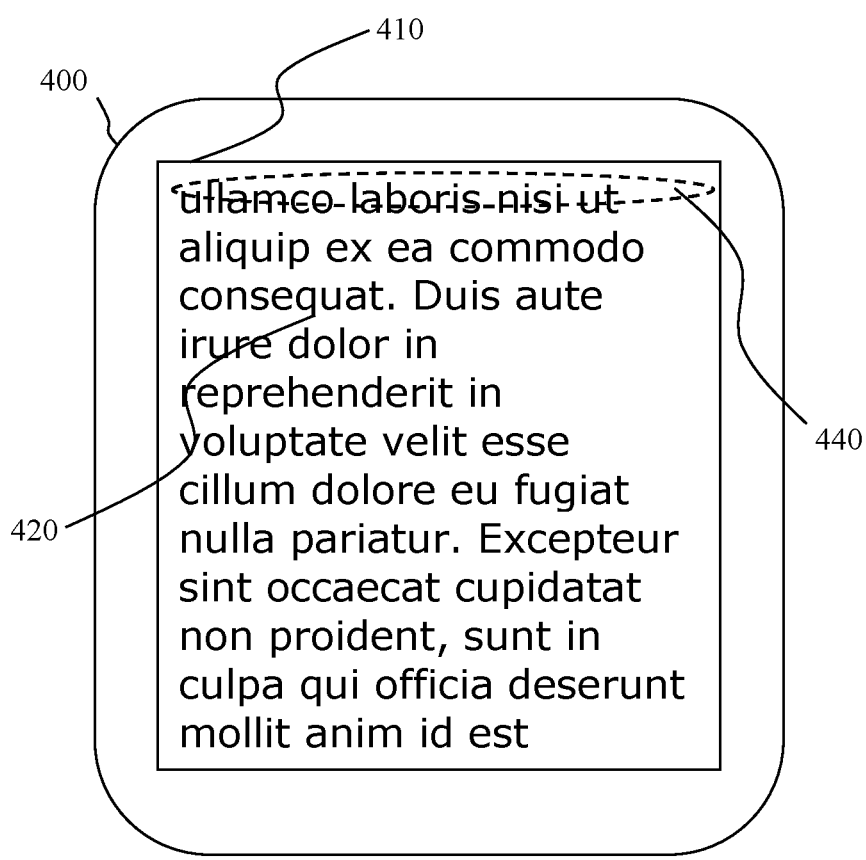

Electronic device 400 includes display 405 comprising window 410. Window 410 displays a first portion of document 420. Document 420 can be scrolled vertically or horizontally by sliding input object 430 along a side of device 400, outside display 405. FIG. 4a shows the moment, when the user, who has been sliding input object 430 vertically up along the right side of device 400, breaks contact with device 400 to initiate inertial scrolling of document 420. A horizontal area 440 of the image of document 420, area 440 being displayed at substantially the level of the vertical dimension of window 410, corresponding to the location of input object 430 at the moment when input object 440 breaks contact with device 400, is selected as "initial pointed document area". Area 440 may be highlighted with a highlighting visual cue, such as, for instance, a yellow ellipse. FIG. 4b shows the end moment of the inertial scrolling. The scrolling ends when area 440 reaches the top border of window 410.

It is understood that various obvious modifications of the third embodiment are possible. In particular, area 440 can be defined as a window-wide area of an area having a limited horizontal dimension, and the highlighting cue highlighting area 440 may have a variety of shapes, sizes, and colors, such as an elongated ellipse shown in FIG. 4 or a small circle displayed on a margin of document 420.

Second Variation of the First Embodiment

The second variation of the first embodiment discloses inertial scrolling, whose distance may or may not be limited to the distance between (a) the window location of "initial pointed document area" at the moment when the inertial scrolling starts, and (b) the window border in the direction of inertial scrolling. The second variation is different in that, depending on the forcefulness of a scrolling user action (e.g., speed, acceleration, abruptness, pressure of the input object against the input device), an inertial scrolling may or may not continue after a "initial pointing document area" reaches a window border. According to the second variation of the first embodiment, while less forceful scrolling user actions may result in inertial scrolling similar to that illustrated by FIGS. 1a-1d, more forceful scrolling user actions may result in an inertial scrolling, not limited to the distance between the window location of "initial pointed document area" at the moment when the inertial scrolling starts, and the window border in the direction of inertial scrolling.

Figure 5A:
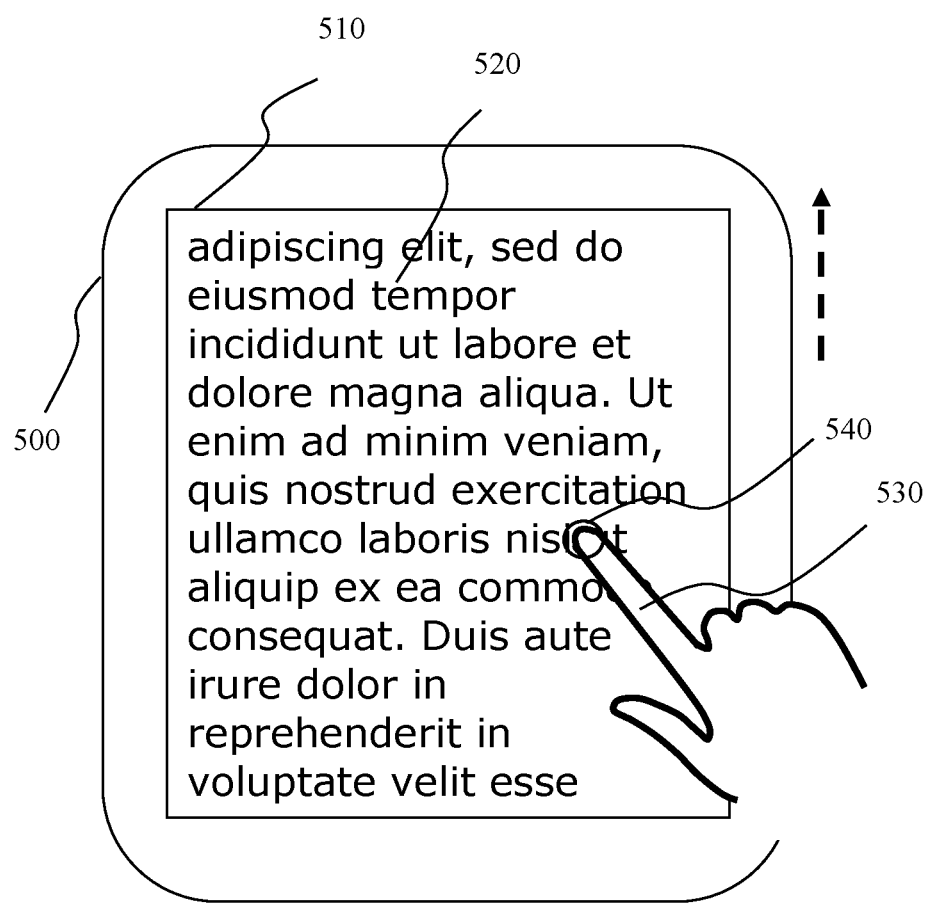
FIGS. 5a-5b illustrate a scrolling method according to the second variation of the first embodiment of the invention, when a touchscreen is used.
Figure 5B:
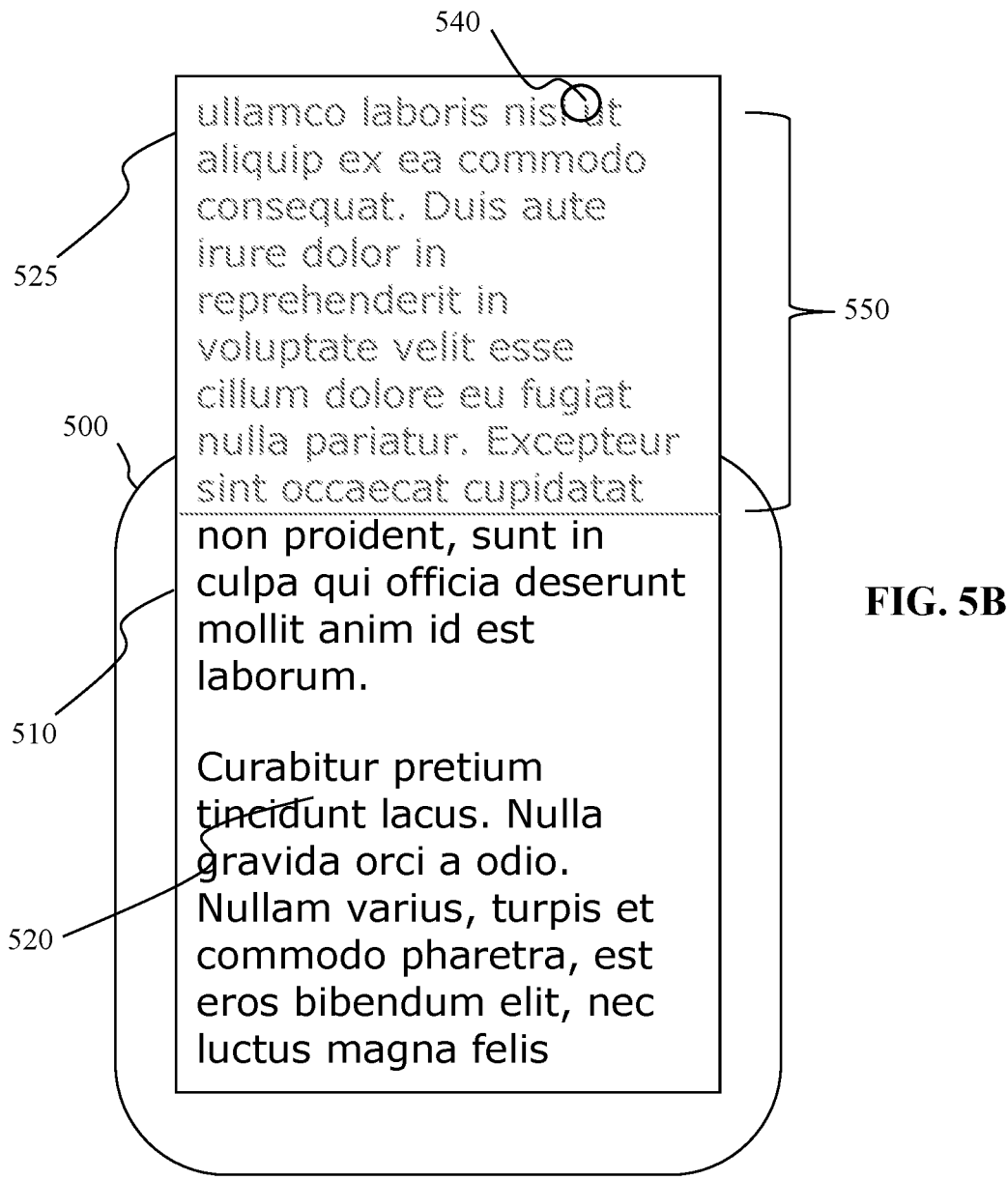

FIG. 5a shows the moment of initiating an inertial scrolling by the user of touchscreen device 500 showing document 520 in window 510. The user breaks contact with touchscreen device 500 by lifting input device 530 (which is shown as user's finger) at a window location that shows "initial pointed document area" 540. The forcefulness of the inertial scrolling action is determined by the speed of input device 530 at the moment of breaking contact with device 500. In turn, the forcefulness of the inertial scrolling action determined the speed of the inertial scrolling, and, in particular, the speed of "initial pointed document area" 540 at the moment, when "initial pointed document area" 540 reaches the top border of window 510. If the speed does not exceed a predetermined speed value, "initial pointed document area" 540 stops at the border and the inertial scrolling of document 520 ends. If the speed exceeds a predetermined speed, document 520 continues to scroll for additional distance 550 after "initial pointed document area" 540 moves beyond the limits of window 510 (FIG. 5b).

A more general description of the second variation is as follows. When an inertial scrolling user action is detected:
  detecting at least an attribute of said inertial scrolling, said at least an attribute detected at the moment when an inertial scrolling is initiated by the user, said at least an attribute selected from a group comprising at least: speed of the input object, speed of said inertial scrolling, acceleration of the input object, acceleration of said inertial scrolling, anticipated deceleration of said inertial scrolling of said document and pressure of said input object against the display; and
  inferring an anticipated distance, for which a document displayed in said window would scroll if a distance of said document scrolling would not be limited to substantially a distance between said "initial window location" and a border of said display window in the direction of said inertial scrolling; and
  if the inferred distance is greater than a distance between "initial pointed document area" and a border of said window in a direction of said scrolling, and a difference between said distances is not greater than a first predetermined value, then perform inertial scrolling of said document in said window for a distance equal to a distance between "initial pointed document area" and said border of said window in the direction of said scrolling, and
  if the inferred distance is greater than a distance between "initial pointed document area" and a border of said window in a direction of said scrolling, and a difference between said distances is greater than a first predetermined value, then perform inertial scrolling of said document in said window is for a distance equal to said inferred distance.

According to all embodiments of the invention, the size, shape, color, brightness, transparency, and other attributes of the highlighting visual cue disclosed in the invention can be defined or selected by the user. The user may also select options and preferences, including enabling or disabling the visual cue, time thresholds, types of the visual cue, and a spatial offset between screen pointer location (alternatively, user contact point when using a touchscreen device) and a visual cue. For instance, the user may prefer a visual cue to be displayed on a margin of a document rather than overlaid on the content of a document.

While the scrolling input devices shown above are touchpad and touchscreen, it is obvious to those skilled in the art that many other types of devices can be used to perform scrolling actions, including, but limited to, scroll wheels, joysticks, trackpads, graphic tablets, are covered by the invention. In these cases, the direction and distance of scrolling are determined by the parameters of the user action, such as direction, distance, time, and speed, performed on a scroll wheel or other alternative scrolling input device.

In addition, while the example of a separate scrolling input device illustrated in the description above, a touchpad, can also be used for controlling the position of a screen pointer, it is understood that a separate scrolling input device in the context of this invention can have a more limited functionality, not including the control of a screen pointer. The use of such scrolling input devices can be combined with other devices, which can be used to control the position of a screen pointer.

Furthermore, while the figures above illustrate only one type of screen pointers, an arrow, it is understood that other types of screen pointers, including hand-shaped pointers, text cursors (e.g., short vertical or oblique lines), and so forth, are covered by the present invention.

In it understood that the invention can be employed in network computing environments with various types of computer system configurations, including the use of cloud memory storage and distributed execution of computer executable instructions by configurations of processors.

What is claimed is:

1. A method for assisting a user of an electronic device in viewing information on said electronic device, said electronic device having at least a processor, a memory storage storing computer-executable instructions, a display having an at least a window displaying a document, and a scrolling input device, said method comprising the method steps of
  displaying a first portion of said document in said display window; and
  detecting an inertial scrolling user action initiated by a user, which scrolling user action detecting comprises at least detecting a direction of an inertial scrolling caused by said scrolling user action and detecting an "initial window location", said "initial window location" being an area of said display window, which area is contacted, or pointed at, by the user when breaking contact with said scrolling input device; and
  performing an inertial scrolling of said document to a second portion of said document, while limiting a distance of said scrolling to substantially a distance between said "initial window location" and a border of said display window in the direction of said inertial scrolling.

2. A method of claim 1, further comprising the steps of detecting an "initial pointed document area", said "initial pointed document area" being a document image area, displayed substantially in said "initial window location" when said inertial scrolling action is initiated; and highlighting said "initial pointed document area" during said inertial scrolling caused by said inertial scrolling user action.

3. A method of claim 2, wherein visual attributes of said highlighted "initial pointed document area" change when said highlighted "initial pointed document area" reaches said border of said display window in the direction of said inertial scrolling.

4. A method of claim 1, wherein said electronic device comprises a touch-sensitive display, said touch-sensitive display being a display, at least part of which display serving as a sensing input device, and said "initial window location" being a location of a said touch-sensitive display, which location is contacted by a user immediately before the user breaks contact with the display to initiate said inertial scrolling.

5. A method of claim 1, wherein said electronic device comprises a separate scrolling input device, said separate device being separate from said display, and said display displays a screen pointer controlled by a user, and wherein said "initial window location" is a window location of said screen pointer at a moment when said inertial scrolling is initiated by the user.

6. A method of claim 1, further comprising the steps of:
detecting at least an attribute of said inertial scrolling, said at least an attribute detected at the moment when said inertial scrolling is initiated by the user, said at least an attribute selected from a group comprising at least: speed of the input object, speed of said inertial scrolling, acceleration of the input object, acceleration of said inertial scrolling, anticipated deceleration of said inertial scrolling of said document and pressure of said input object against the display; and
inferring an anticipated distance, for which said document displayed in said window would scroll if a distance of said document scrolling would not be limited to substantially a distance between said "initial window location" and said border of said display window in the direction of said inertial scrolling; and
if said inferred distance is greater than said distance between said "initial window location" and said border of said window in the direction of said scrolling, and a difference between said inferred distance and said distances between said "initial window location" and said border of said window in the direction of said scrolling is not greater than a first predetermined value, then performing said inertial scrolling of said document in said window for a distance substantially equal to said distance between "initial window location" and said border of said window in the direction of said scrolling; and
if said inferred distance is greater than a distance between "initial window location" and a border of said window in a direction of said scrolling, and a difference between said inferred distance and said distance between said "initial window location" and said border of said window in the direction of said scrolling is greater than the first predetermined value, then performing said inertial scrolling of said document in said window for a distance substantially equal to said inferred distance.

7. A method of claim 2, further comprising the steps of:
detecting a speed, with which said document scrolls at a moment when said "initial pointed document area" reaches said border of said display window in the direction of said inertial scrolling; and
limit a distance of said inertial scrolling to substantially said distance between said "initial window location" and said border of said display window in the direction of said inertial scrolling only if said speed does not exceed a second predetermined value.

8. An apparatus, comprising at least a processor; and
a scrolling input device; and
a display, adapted to display at least a window adapted to displaying at least a document; and
a memory storage storing computer-executable instructions;
wherein said display, said processor, said memory storage, and said computer-executable instructions being adapted to perform the following
displaying a first portion of said document in said display window; and
detecting an inertial scrolling user action, which detecting comprises at least detecting a direction of an inertial scrolling caused by said inertial scrolling user action and detecting an "initial window location", said "initial window location" being an area of said display window pointed at by a user when breaking contact with said scrolling input device; and
performing an inertial scrolling of said document to a second portion of said document; a distance of said document scrolling being limited to substantially a distance between said "initial window location" and a border of said display window in the direction of said inertial scrolling.

9. An apparatus of claim 8,
wherein said display is a touch-sensitive display, said touch-sensitive display being a display, at least part of which also serves as a scrolling input device, and
said processor, said touch-sensitive display, said memory storage, and said computer-executable instructions are further adapted to perform the following
detecting a scrolling user action, said action being initiated by touching the display with a scrolling input object, such as a finger; and
detecting an "initial window location" as a location of a point of a scrolling input object touch at a moment when the user breaks a contact of the scrolling input object and the display to initiate an inertial scrolling.

10. An apparatus of claim 8, wherein said scrolling input device is a device, separate from said display, and said display is adapted to display a screen pointer in said display window, and said apparatus further comprises a screen pointer input device, said screen pointer input device being adapted to control a screen location of said screen pointer, and said processor, said display, said scrolling input device, screen pointer input device, and said memory storage are adapted to detect an "initial window location" as a location pointed at by said screen pointer at a moment when an inertial scrolling is initiated by the user.

11. An apparatus of claim 10, wherein said screen pointer input device is integrated with said scrolling input device.

12. A method of claim 1, wherein said electronic device comprises at least a separate scrolling input device, said separate device being a unidimensional scrolling input device placed outside the display, said unidimensional scrolling input device being adapted to be used without the user directly pointing to a scrolled content, and wherein, an "initial pointed document area", is defined by only one coordinate.

13. The method of claim 2, further comprising:
wherein in a first gesture said inertial scrolling continues until said "initial pointed document area" reaches said window border in the direction of said inertial scrolling, and
wherein in a second gesture said inertial scrolling terminates before said "initial pointed document area" reaches said window border in the direction of said inertial scrolling.

14. A method of claim 2, wherein said inertial scrolling, once initiated, does not stop until said "initial pointed document area" reaches said border of said display window in the direction of said inertial scrolling.

* * * * *

UNITED STATES PATENT AND TRADEMARK OFFICE
CERTIFICATE OF CORRECTION

PATENT NO. : 12,399,610 B2
APPLICATION NO. : 18/084717
DATED : August 26, 2025
INVENTOR(S) : Viktor Kaptelinin It is certified that error appears in the above-identified patent and that said Letters Patent is hereby corrected as shown below:

In the Specification

Column 10, Line 56, starting with "A Method for Establishing...": entire line should be a heading.
Column 4, Line 31: "of a personal digital artifacts" should read --of personal digital artifacts--.
Column 5, Line 51: "In the content of the present" should read --In the context of the present--.
Column 6, Line 2: "generally the words" should read --generally between the words--; Line 37: "would no window" should read --would be no window--.
Column 7, Line 13: "displays, window" should read --displays window--; Line 34: "to the first portion" should read --to the second portion--; Line 64: "detected at" should read --is detected at--.
Column 9, Line 28: "on p. 18 of this document." should read --in column 12 of this document.--.
Column 10, Line 60: "is has the shape" should read --has the shape--.
Column 11, Line 19: "difference between from" should read --difference from--; Line 43: "to the first portion" should read --to the second portion--.
Column 12, Line 58: "window-wide area of an area" should read --window-wide area or an area--.
Column 13, Line 8: "a "initial pointing document area"" should read --an "initial pointed document area"--.
Column 13, Line 21 and Lines 24-25: "input device 530" should read --input object 530--.
Column 14, Line 2: "window is for" should read --window for--; Line 18: "including, but limited to" should read --including, but not limited to--; Line 19: "tablets, are" should read --tablets, and are--; Line 39: "In it understood" should read --It is understood--.

In the Claims

Column 15, Claims 2-7, 12, and 14, first Line of each claim: "A method of claim" should read --The method of claim--.
Column 16, Claims 9-11, first Line of each claim: "An apparatus of claim" should read --The apparatus of claim--.

Signed and Sealed this
Thirtieth Day of September, 2025

John A. Squires
*Director of the United States Patent and Trademark Office*